Nov. 3, 1964 A. H. WULFSBERG ETAL 3,155,907
FREQUENCY SYNTHESIS SYSTEM FOR MULTI-FREQUENCY
TRANSMITTER-RECEIVER
Filed Jan. 21, 1952
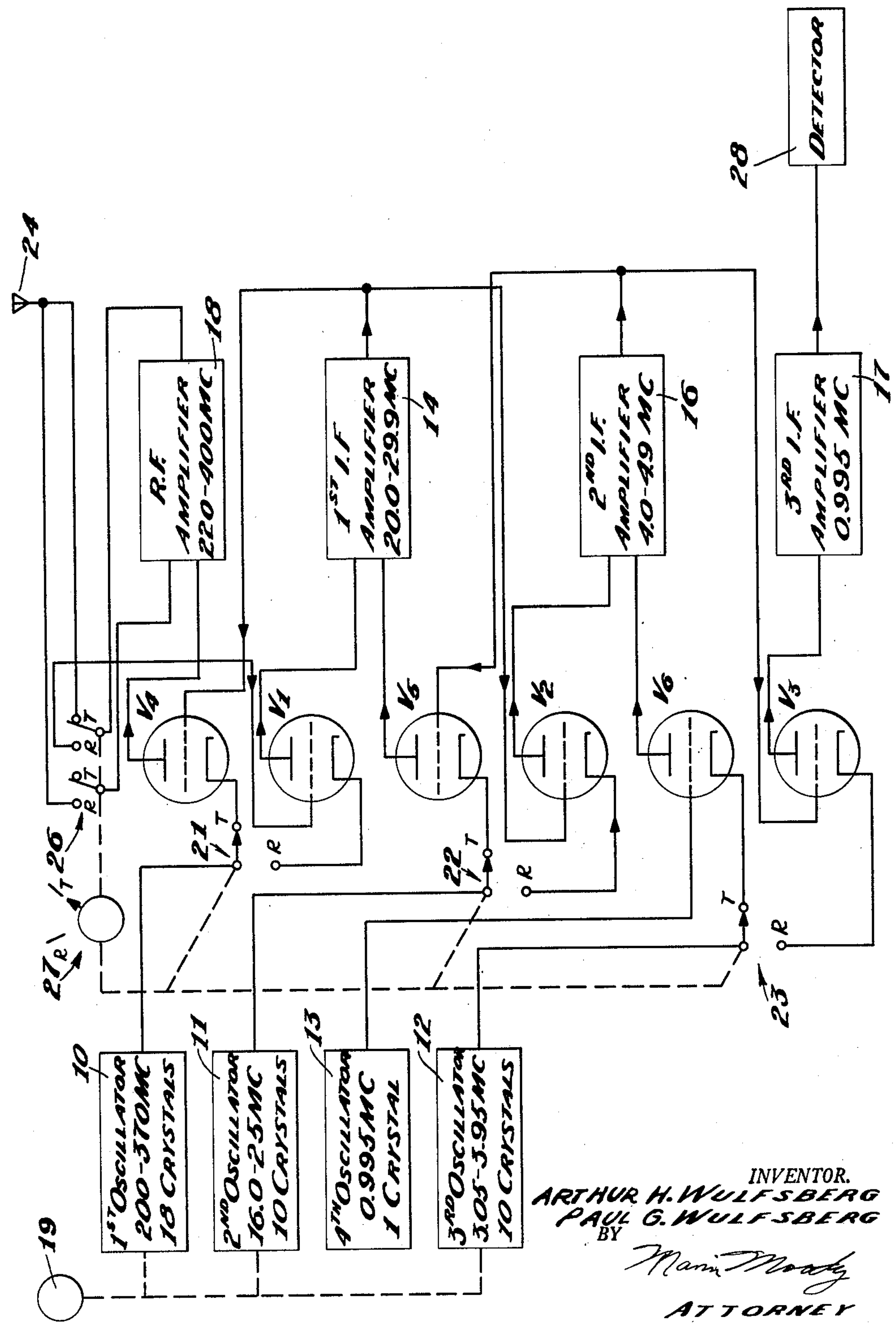
INVENTOR.
ARTHUR H. WULFSBERG
PAUL G. WULFSBERG
BY
Marvin Moody
ATTORNEY 3,155,907
Patented Nov. 3, 1964

3,155,907

FREQUENCY SYNTHESIS SYSTEM FOR MULTIFREQUENCY TRANSMITTER-RECEIVER

Arthur H. Wulfsberg and Paul G. Wulfsberg, Cedar Rapids, Iowa, assignors to Collins Radio Company, Cedar Rapids, Iowa, a corporation of Iowa Filed Jan. 21, 1952, Ser. No. 267,484
4 Claims. (Cl. 325—18)

This invention relates to a frequency synthesis system for a multifrequency transmitter-receiver.

The increased use of very high and ultra-high frequencies in aeronautical and military communications has presented the problem of operating radio transmitters and receivers on any one of a large number of frequencies. The individual frequencies must be very closely controlled which generally means that quartz type crystal oscillators must be used. In many cases the transmitters and receivers operate on as many as 2000 frequencies, and if a different crystal were used for each transmitting and receiving frequency, 4000 would be required. Such a number would be impractical because of the great bulk of the circuitry required.

It is an object of this invention therefore to provide a frequency synthesis system for multifrequency transmitters and receivers.

Another object of this invention is to provide a synthesis system wherein the same oscillators are used in the transmitting and the receiving cycles of operation.

Yet another object of this invention is to provide a frequency synthesis system wherein the same amplifiers are used during transmission and reception.

Further objects, features and advantages of this invention will become apparent from the following description and claims when read in view of the drawing, in which;

The figure illustrates schematically the frequency synthesis system of this invention.

For illustrative purposes to simplify explanation particular frequencies will be used. It is to be understood, however, that the frequencies used in the explanation are examples only and other frequencies may be used without deviating from the intent of the invention.

The receiver and transmitter illustrated are designed to operate on 1800 different frequencies between 220–400 megacycles. Only 39 crystals are used to obtain transmission and reception on this large number of frequencies.

A first crystal oscillator is designated as 10 and contains 18 crystals and is step-variable in between 200–370 megacycles. A second oscillator designated as 11 contains 10 crystals and is step-variable over the range 16 to 25 megacycles. A third oscillator designated as 12 contains 10 crystals step-variable in the range of 3.05 and 3.95 megacycles, and a fourth fixed frequency oscillator designated as 13 contains one crystal at 0.995 megacycles.

The receiving portion comprises three mixing tubes designated as $V_1$, $V_2$ and $V_3$ and the transmitting portion comprises three other tubes designated as $V_4$, $V_5$ and $V_6$.

The mixing tubes $V_1$ and $V_5$ are connected to an intermediate frequency amplifier 14 which has a bandpass characteristic between 20.0 and 29.9 megacycles. A second intermediate frequency amplifier 16 has a bandpass characteristic between 4.0 and 4.9 megacycles. A third intermediate frequency amplifier 17 is tuned to 0.995 megacycles.

A radio frequency amplifier 18 has a bandpass characteristic from 220–400 megacycles. A frequency selecting knob 19 is connected to the oscillators 10, 11 and 12 and may be rotated to select any one of the desired 1800 operating frequencies. The various frequencies are obtained by choosing different combinations of the 38 crystals in oscillators 10, 11 and 12. The oscillator 10 may be selectively connected to the cathodes of the tubes $V_4$ or $V_1$ by a two position switch 21.

The oscillator 11 may be connected to the cathodes of tubes $V_5$ or $V_2$ by a two position switch 22. The oscillator 12 may be connected to the cathodes of tube $V_6$ or $V_3$ by a two position switch 23.

An antenna 24 is connected to switching means designated generally as 26 which is connected to the radio amplifier 18. A transmit-receiver selector knob 27 is connected to control the switches 21, 22, 23 and 26.

During transmission the switches are in the positions shown in the figure. One of the output frequencies of the oscillator 12 is supplied to the mixing tube $V_6$ and combined with the single output frequency of oscillator 13 to form any one of ten frequencies in the band 4.0 to 4.9 megacycles.

The output frequency of amplifier 16 is supplied to the control grid of the second mixer tube $V_5$ which also receives an input of one of the ten frequencies from the oscillator 11 to produce any one of 100 frequencies in the band 20.0 to 29.9 megacycles.

The intermediate frequency amplifier 14 passes the signal to the transmitter mixer $V_4$ which also receives any one of 18 crystal output frequencies from the oscillator 10 so as to produce any one of 1800 different frequencies between 220–400 megacycles. The radio frequency amplifier 18 receives the output of the tube $V_4$ and furnishes it to the antenna through the switching means 26.

In reception, the knob 27 is moved to the "R" position thus changing the positions of switches 26, 21, 22 and 23. The energy received by the antenna 24 is supplied to the input side of the radio frequency amplifier 18 and the output of the amplifier is connected to the control grid of a first receiver mixer $V_1$. The cathode of the tube $V_1$ receives any one of 18 crystal outputs from the oscillator 10.

The tube $V_1$ supplies an input to the first intermediate frequency amplifier 14 which is connected to the control grid of a second receiver mixer $V_2$.

The mixer $V_2$ receives an input from the second oscillator 11 and is connected to the second intermediate frequency amplifier 16. The amplifier 16 is in turn connected to a third receiver mixer $V_3$ which receives one of 10 inputs from the third oscillator 12.

A third intermediate frequency amplifier 17 receives the output of the third mixer $V_3$ and supplies an output to a detector 28.

It is seen that the invention provides a system that is capable of transmitting and receiving on 1800 frequency channels while using only 39 crystals. The principle of this invention is applicable to obtain any larger number of frequency inputs and outputs from a receiver and transmitter.

Although this invention has been described with respect to a particular embodiment thereof, it is not to be so limited as changes and modifications may be made therein which are within the full intended scope of the invention as defined by the appended claims.

We claim:

1. A combination transmitter-receiver comprising, six mixing tubes, four oscillators with three of said oscillators containing a plurality of crystals, a first two-position switch connected to a first of said oscillators and selectively movable between the cathodes of the first and fourth mixing tubes, a second two-position switch connected to a second oscillator and selectively movable between the cathodes of the second and fifth mixer tubes, a third two-way switch connected to a third oscillator and selectively movable between the cathodes of the third and sixth mixer tubes, a first intermediate frequency amplifier connected to the plates of the first and fifth mixer tubes and supplying an output to the second and fourth mixer tubes, a second intermediate frequency amplifier receiving inputs from the second and sixth mixer tubes and supplying an output to the third and fifth mixer tubes, a third intermediate frequency amplifier receiving an input from the plate of the third mixer tube, the fourth oscillator connected to the sixth mixer tube, an antenna, a switching means having receive and transmit positions, a unidirectional radio-frequency amplifier, the receive position of said switching means connecting the input of said radio-frequency amplifier to said antenna and the output of said amplifier to the input of said first mixer tube, the transmit position of said switching means connecting the output of said radio-frequency amplifier only to said antenna, with the input of said radio-frequency amplifier being connected to the plate of said fourth mixer, an antenna connected to one side of the antenna switching means, the plate of the fourth mixer tube connected to said antenna switching means, the grid of the first mixer tube connected to said antenna switching means, said third intermediate frequency amplifier being tuned to the frequency of said fourth oscillator, said second intermediate frequency amplifier being tuned to the sum of the frequencies of said third and fourth oscillators, and the first intermediate frequency amplifier being tuned to the sum of the frequencies of said second oscillator and the output of said second intermediate frequency amplifier.

2. In a radio transmitter-receiver set the combination of a radio frequency amplifier, a plurality of pairs of mixers having an intermediate frequency amplifier electrically connected between each adjacent pair, a stepped-frequency oscillator associated with each pair, each of said pairs being connectable to a given one of said stepped-frequency oscillators and including a receiver mixer, each of the intermediate frequency amplifiers having an input terminal connected to the output of preceding receiver mixer and an output terminal connected to the input of the succeeding receiver mixer, a final intermediate frequency amplifier connected to the output of the last of said receiver mixers, manually operable switch means in a receive position connecting the output of said radio frequency amplifier to the input of the first of said receiver mixers and connecting the output of each of said oscillators respectively to the inputs of said receiver mixer, whereby said set is adapted to receive a selected frequency determined by the frequencies of said oscillators, each of said pairs also including a transmitter mixer, each of said intermediate frequency amplifiers having an input terminal connected to the output of the preceding transmitter mixer and an output terminal connected to the input of the succeeding transmitter mixer, a fixed frequency oscillator connected to the input of the first of said transmitter mixers, said manually operable switch means in a transmit position connecting the outputs of said stepped-frequency oscillators respectively to the inputs of said transmitter mixers and connecting the output of the last of said transmitter mixers to the input of said radio frequency amplifier, whereby said set is adapted to transmit said selected frequency as determined by the frequency of said oscillators, said intermediate frequency amplifiers being tuned to the sum frequency of the input frequencies to the preceding transmitter mixers.

3. In a multiple conversion transmitter-receiver having at least one unidirectional intermediate-frequency amplifier comprising first and second oscillator means, a first pair of frequency mixers, each having one input alternately connectable to said first oscillator means, and a second pair of frequency mixers, each having one input alternately connectable to said second oscillator means, the first mixer of each pair heterodyning the receiver signal, the other mixer in each pair heterodyning the transmitter frequency, the output of said intermediate-frequency amplifier being connected in common to the other input of the transmitter mixer in said first pair and to the other input of said receiver mixer in said second pair, and the input of said intermediate-frequency amplifier being connected in common to the output of said receiver mixer in said first pair and the output of said transmitter mixer in said second pair, whereby said intermediate-frequency amplifier is common to said transmit and receive functions.

4. In a multiple conversion transceiver having at least two unidirectional intermediate-frequency amplifiers comprising at least three pairs of frequency mixers, each pair including a receiving mixer and a transmitting mixer; first, second and third oscillator means alternately connectable between the receiving mixer and the transmitting mixer in each of said first, second and third mixer pairs respectively, one of said intermediate-frequency amplifiers having its input connected in common to the output of the receiving mixer in said first pair and the output of said transmitting mixer in said second pair, the output of said one intermediate-frequency amplifier connected in common to the other input to the transmitting mixer in said first pair and to the other input to the receiving mixer in said second pair; said other intermediate-frequency amplifier having its input connected in common to the output of said receiving mixer in said second pair and the output of said transmitting mixer in said third pair, and the output of said other intermediate-frequency amplifier connected in common to the other input of the transmitting mixer in said second pair and the other input to said receiving mixer in said third pair.

References Cited in the file of this patent

UNITED STATES PATENTS

| | | |
|---|---|---|
| 2,073,038 | Wheeler | Mar. 9, 1937 |
| 2,419,593 | Robinson | Apr. 29, 1947 |
| 2,439,408 | Mitchell | Apr. 13, 1948 |
| 2,529,443 | Bach | Nov. 7, 1950 |
| 2,529,550 | Harris | Nov. 14, 1950 |
| 2,653,222 | Williams et al. | Sept. 22, 1953 |